(12) United States Patent
Bekisli et al.

(10) Patent No.: US 12,429,092 B2
(45) Date of Patent: *Sep. 30, 2025

(54) FUNCTIONALLY GRADED COMPOSITE STRUCTURES

(71) Applicant: Dover Pumps & Process Solutions Segment, Inc., Downers Grove, IL (US)

(72) Inventors: Burak Bekisli, The Woodlands, TX (US); Tanil Ozkan, Pearland, TX (US)

(73) Assignee: Dover Pumps & Process Solutions Segment, Inc., Downers Grove, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/736,259

(22) Filed: Jun. 6, 2024

(65) Prior Publication Data

US 2024/0410424 A1 Dec. 12, 2024

Related U.S. Application Data

(63) Continuation of application No. 17/469,152, filed on Sep. 8, 2021, now Pat. No. 12,297,867.

(Continued)

(51) Int. Cl.
*F16C 33/62* (2006.01)
*B29C 43/20* (2006.01)
(Continued)

(52) U.S. Cl.
CPC ............ *F16C 33/62* (2013.01); *B29C 43/203* (2013.01); *F16J 9/26* (2013.01); *B29K 2105/251* (2013.01);
(Continued)

(58) Field of Classification Search
CPC ......... F16J 9/26; F16J 15/3496; B29C 43/203
See application file for complete search history.

(56) References Cited

U.S. PATENT DOCUMENTS

| | | |
|---|---|---|
| 2,973,978 A | 3/1961 | Oppenheim |
| 3,542,374 A | 11/1970 | Neilson et al. |

(Continued)

FOREIGN PATENT DOCUMENTS

| | | |
|---|---|---|
| DE | 3833966 | 4/1990 |
| DE | 102015225823 | 6/2017 |

(Continued)

OTHER PUBLICATIONS

International Search Report and Written Opinion in International Appln. No. PCT/US2021/049477, dated Apr. 5, 2022, 29 pages.

(Continued)

*Primary Examiner* — Vishal V Vasisth
(74) *Attorney, Agent, or Firm* — Fish & Richardson P.C.

(57) ABSTRACT

A composite ring includes a first region including a first polymeric material; a second region including a second polymeric material; and an interfacial region defining a compositional gradient between the first region and the second region; wherein a wear resistance of the first region is different from a wear resistance of the second region. A composite bearing includes a first layer including a first polymeric material and a first filler; a second layer disposed on the first layer, the second layer including a second polymeric material and a second filler; and an interfacial region defining a compositional gradient between the first layer and the second layer, wherein a wear resistance of the first layer is greater than a wear resistance of the second layer, and wherein a mechanical strength of the second layer is greater than a mechanical strength of the first layer.

19 Claims, 12 Drawing Sheets

Related U.S. Application Data

(60) Provisional application No. 63/075,652, filed on Sep. 8, 2020.

(51) Int. Cl.
*F16J 9/26* (2006.01)
*B29K 105/00* (2006.01)

(52) U.S. Cl.
CPC ...... *F16C 2208/32* (2013.01); *F16C 2220/08* (2013.01); *F16C 2220/20* (2013.01); *F16C 2220/60* (2013.01); *F16C 2360/42* (2013.01)

(56) References Cited

U.S. PATENT DOCUMENTS

| | | |
|---|---|---|
| 3,736,007 A | 5/1973 | Heilhecker et al. |
| 3,780,418 A | 12/1973 | Hurst |
| 4,147,824 A | 4/1979 | Dettmann et al. |
| 4,602,791 A | 7/1986 | Zöllner |
| 4,900,629 A | 2/1990 | Pitolaj |
| 4,961,891 A | 10/1990 | Pitolaj |
| 5,032,335 A | 7/1991 | Wilson |
| 5,399,307 A | 3/1995 | Dalton et al. |
| 5,551,707 A | 9/1996 | Pauley et al. |
| 5,698,300 A | 12/1997 | Wimmer et al. |
| 5,867,900 A | 2/1999 | Larson et al. |
| 5,903,815 A | 5/1999 | Scott |
| 6,085,788 A | 7/2000 | Larson et al. |
| 6,286,837 B1 | 9/2001 | Humphrey |
| 7,581,734 B1 | 9/2009 | McLeod |
| 8,231,376 B2 | 7/2012 | Iwakiri et al. |
| 8,647,561 B2 | 2/2014 | Fang et al. |
| 9,511,523 B2 | 12/2016 | Wojcicki |
| 9,782,956 B2 | 10/2017 | Liao et al. |
| 9,803,690 B2 | 10/2017 | Ziegler et al. |
| 9,981,284 B2 | 5/2018 | Guo et al. |
| 10,113,588 B2 | 10/2018 | Schmitjes |
| 10,359,116 B2 | 7/2019 | Feistel |
| 11,788,541 B2 | 10/2023 | Kvachnev |
| 2003/0034582 A1 | 2/2003 | Dittrich et al. |
| 2004/0037984 A1 | 2/2004 | Ueda et al. |
| 2004/0141871 A1 | 7/2004 | Kondo et al. |
| 2004/0227301 A1 | 11/2004 | Wood et al. |
| 2007/0290402 A1 | 12/2007 | Edwards |
| 2008/0012236 A1 | 1/2008 | Reilly |
| 2008/0260565 A1 | 10/2008 | Okano et al. |
| 2013/0259968 A1 | 10/2013 | Wojcicki |
| 2013/0337218 A1 | 12/2013 | Liu et al. |
| 2015/0070124 A1 | 3/2015 | Kapoor et al. |
| 2015/0137404 A1 | 5/2015 | Tuchinskiy |
| 2015/0376864 A1 | 12/2015 | Choi et al. |
| 2016/0327090 A1 | 11/2016 | Shibamiya et al. |
| 2016/0345692 A1 | 12/2016 | Baker et al. |
| 2022/0074400 A1 | 3/2022 | Zhou et al. |

FOREIGN PATENT DOCUMENTS

| | | |
|---|---|---|
| JP | H11-63226 | 3/1999 |
| JP | 2011-112202 | 6/2011 |
| JP | 5224231 | 7/2013 |
| WO | WO 1980/001832 | 9/1980 |
| WO | WO 2013/177403 | 11/2013 |
| WO | WO 2014/175972 | 10/2014 |

OTHER PUBLICATIONS

International Search Report and Written Opinion in International Appln. No. PCT/US2021/049715, dated Dec. 13, 2021, 15 pages.
Invitation to Pay Additional Fees in International Appln. No. PCT/US2021/049477, dated Dec. 22, 2021, 17 pages.
Search Report in European Appln. No. 21794035.2, mailed on Jun. 7, 2024, 16 pages.
Wikipedia.org [online], "Perfluoroalkoxy alkane," Feb. 2014, retrieved on Apr. 8, 2022, retrieved from URL <https://en.wikipedia.org/wiki/Perfluoroalkoxy_alkane>, 3 pages.
Wikipedia.org [online], "Polyether ether ketone," Jun. 2003, retrieved on Apr. 8, 2022, retrieved from URL <https://en.wikipedia.org/wiki/Polyether_ether_ketone>, 4 pages.
Wikipedia.org [online], "Ultra-high-molecular-weight polyethylene," Jun. 2005, retrieved on Apr. 8, 2022, retrieved from URL <https://en.wikipedia.org/wiki/Ultra-high-molecular-weight polyethylene>, 9 pages.
Search Report in British Appln. No. GB2504266.4, mailed on Apr. 3, 2025, 4 pages.

FUNCTIONALLY GRADED COMPOSITE STRUCTURES

CROSS-REFERENCE TO RELATED APPLICATIONS

This application is a CON of 17469152, now U.S. Pat. No. 12,297,867, filed Sep. 8, 2021 wherein 17469152 has PRO of 63/075,652, filed Sep. 8, 2020. 35 U.S.C. § 120 to U.S. application Ser. No. 17/469,152, now U.S. Pat. No. 12,297,867, filed on Sep. 8, 2021, which claims priority under 35 U.S.C. § 119 to U.S. Application Ser. No. 63/075,652, filed on Sep. 8, 2020, and entitled "Functionally Graded Composite Structures," the entire contents of each of which are incorporated by reference herein.

TECHNICAL FIELD

The present disclosure generally relates to functionally graded composite structures, such as functionally graded composite rings, e.g., for use in reciprocating gas compressors, or functionally graded composite bearings for use in rotating machinery.

BACKGROUND

Mechanical components such as wear rings, rod rings, piston rings, wear bands, back-up rings, bearings, or dynamic seal rings are integral parts of mechanical systems, such as reciprocating gas compressors or rotating machinery such as gas or steam turbines, motors, pumps, generators, turbomachinery, rotary compressors, axial compressors, or centrifugal compressors. The mechanical components provide support to the mechanical system, such as by managing heat, aiding in motion, enhancing the durability of the system, narrowing gas flow, and enabling other parts to carry out their task efficiency.

SUMMARY

This specification describes functionally graded composite structures, such as rings, tubes, ring segments, or bearings, and methods that can be used to make functionally graded composite structures. The functionally graded composite structures described here can be used as part of a mechanical system, such as a reciprocating gas compressor, or rotating machinery such as gas or steam turbines, motors, pumps, generators, turbomachinery, rotary compressors, axial compressors, or centrifugal compressors. The functionally graded composite structures include two or more polymeric regions of differing compositions and properties, with an interfacial region defining a compositional gradient between the regions. Properties such as strength, stiffness, wear resistance, creep resistance, or thermal conductivity can be controlled for each region, e.g., by incorporating fillers into each polymeric region that impart the desired properties to the region. For instance, in a composite ring, the region of the ring that is exposed to wear during operation of the mechanical system can be formed of a composition that provides improved wear resistance, while other regions of the ring can provide thermal conductivity, mechanical stiffness or strength, or other properties to the ring.

In an aspect, a composite ring includes a first region including a first polymeric material; a second region including a second polymeric material; and an interfacial region defining a compositional gradient between the first region and the second region; wherein a wear resistance of the first region is different from a wear resistance of the second region.

Embodiments can include one or any combination of two or more of the following features.

A thermal conductivity of the first region differs from a thermal conductivity of the second region.

A stiffness of the first region differs from a stiffness of the second region.

A mechanical strength of the first region differs from a mechanical strength of the second region.

The wear resistance of the first region is greater than the wear resistance of the second region. A thermal conductivity of the second region is greater than a thermal conductivity of the first region. A stiffness of the second region is greater than a stiffness of the first region, or a mechanical strength of the second region is greater than a mechanical strength of the first region, or both.

The first polymeric material and the second polymeric material each independently includes one or more of polyether ether ketone, polyether ketone, polyether ketone ketone, polyphenylene sulfide, polyimide, perfluoroalkoxy alkane, ultra-high-molecular-weight polyethylene, polybenzimidazole, polyamide-imide, polyphenylsulfone, or a fluoropolymer. The first polymeric material, the second polymeric material, or both include polytetrafluoroethylene. The first polymeric material, the second polymeric material, or both includes one or more of polyether ketone, polyether ketone ether ketone ketone, or polyether ketone ketone.

The compositional gradient lies along a radius of the ring. A surface of the first region defines an outer circumference of the ring and a surface of the second region defines an inner circumference of the ring. A wear resistance of the first region is greater than a wear resistance of the second region, or a wear resistance of the second region is greater than a wear resistance of the first region.

The compositional gradient lies along a portion of an outer circumference of the ring.

The compositional gradient lies along a portion of an inner circumference of the ring.

A first surface of the first region defines a portion of an inner circumference of the ring and a second surface of the first region defines a portion of an outer circumference of the ring. A first surface of the second region defines a portion of an inner circumference of the ring and a second surface of the second region defines a portion of an outer circumference of the ring.

The composite ring includes one or more additional regions, each additional region including a polymeric material independently including one or more of polyether ether ketone, polyether ketone, polyether ketone ketone, polyphenylene sulfide, polyimide, perfluoroalkoxy alkane, and ultra-high-molecular-weight polyethylene, polyamide-imide, polyphenylsulfone, or a fluoropolymer. One or more of the additional regions comprises polytetrafluoroethylene.

The first region, the second region, or both independently includes a filler. The filler includes a lubricant. The filler includes a wear resistant additive. The filler includes one or more of molybdenum disulfide, tungsten disulfide, bronze, boron nitride, titanium dioxide, or aluminum oxide. The filler includes carbon. The filler includes one or more of carbon powder, carbon particles, carbon fibers, graphene, graphite, or carbon nanotubes. The filler includes a polymer. The filler includes one or more of polytetrafluoroethylene, polyether ether ketone, polyphenylene sulfide, polyphenylene sulfide, polyimide, or polybenzimidazole. The filler includes glass. The filler includes one or more of glass beads or glass fibers.

The ring is a wear ring, a rod ring, a piston band, a wear band, or a dynamic seal ring.

In an aspect, a composite bearing includes a first layer including a first polymeric material and a first filler; a second layer disposed on the first layer, the second layer including a second polymeric material and a second filler; and an interfacial region defining a compositional gradient between the first layer and the second layer, wherein a wear resistance of the first layer is greater than a wear resistance of the second layer, and wherein a mechanical strength of the second layer is greater than a mechanical strength of the first layer.

Embodiments can include one or any combination of two or more of the following features.

A thermal conductivity of the first layer differs from a thermal conductivity of the second layer.

A stiffness of the first layer differs from a stiffness of the second layer.

A mechanical strength of the first layer differs from a mechanical strength of the second layer.

The wear resistance of the first layer is greater than the wear resistance of the second layer. A thermal conductivity of the second layer is greater than a thermal conductivity of the first layer. A stiffness of the second layer is greater than a stiffness of the first layer, or a mechanical strength of the second layer is greater than a mechanical strength of the first layer, or both.

The first polymeric material and the second polymeric material each independently includes one or more of polyether ether ketone, polyether ketone, polyether ketone ketone, polyphenylene sulfide, polyimide, perfluoroalkoxy alkane, ultra-high-molecular-weight polyethylene, polybenzimidazole, polyamide-imide, polyphenylsulfone, a polyester (aliphatic, aromatic, aliphatic-aromatic), or a fluoropolymer. The first polymeric material, the second polymeric material, or both include polytetrafluoroethylene. The first polymeric material, the second polymeric material, or both includes one or more of polyether ketone, polyether ketone ether ketone ketone, or polyether ketone ketone.

The composite bearing includes one or more additional layer, each additional layer including a polymeric material independently including one or more of polyether ether ketone, polyether ketone, polyether ketone ketone, polyphenylene sulfide, polyimide, perfluoroalkoxy alkane, and ultra-high-molecular-weight polyethylene, polyamide-imide, polyphenylsulfone, or a fluoropolymer. One or more of the additional layers comprises polytetrafluoroethylene.

The filler includes a lubricant. The filler includes a wear resistant additive. The filler includes one or more of molybdenum disulfide, tungsten disulfide, bronze, boron nitride, titanium dioxide, or aluminum oxide. The filler includes carbon. The filler includes one or more of carbon powder, carbon particles, carbon fibers, graphene, graphite, or carbon nanotubes. The filler includes a polymer. The filler includes one or more of polytetrafluoroethylene, polyether ether ketone, polyphenylene sulfide, polyphenylene sulfide, polyimide, or polybenzimidazole. The filler includes glass. The filler includes one or more of glass beads or glass fibers.

In an aspect, a method of fabricating a composite billet, the method includes providing a first polymeric powder to a first portion of a mold; providing a second polymeric powder to a second portion of the mold; compressing the first polymeric powder and the second polymeric powder in the mold to yield a composite billet, the composite billet including: a first region including a first polymeric material formed by compressing the first polymeric powder; a second region including a second polymeric material formed by compressing the second polymeric powder; and an interfacial region defining a compositional gradient between the first region and the second region; and separating the composite billet from the mold.

Embodiments can include one or any combination of two or more of the following features.

The method includes heating the mold while compressing the first polymeric powder and the second polymeric powder.

The method includes sintering the composite billet.

The method includes, after sintering, compressing material in the mold while the material is hot.

The method includes machining the composite billet. Machining the composite billet including forming rings from the billet. The rings are wear rings, rod rings, piston bands, wear bands, or dynamic seal rings.

In an aspect, a machine component includes a body configured to couple with a moving shaft. The body has a first region that includes a first polymeric material, a second region that includes a second polymeric material, and two or more interfacial regions. At least one of the interfacial regions defines a compositional gradient between the first region and the second region. One or more physical properties of the first region differ from one or more corresponding physical properties of the second region.

Embodiments can include one or any combination of two or more of the following features.

At least one of the physical properties includes a wear resistance.

At least one of the interfacial regions defines a compositional gradient in a circumferential direction.

Each of at least two of the interfacial regions defines a compositional gradient in a circumferential direction.

At least one of the interfacial regions defines a compositional gradient in a radial direction.

The body includes a third region comprising a third polymeric material.

At least one of the interfacial regions defines a compositional gradient between the second region and the third region.

The body includes a ring configured to couple with a reciprocating rod.

The component includes a bearing, and the body is a bearing pad.

The details of one or more embodiments of these systems and methods are set forth in the accompanying drawings and the description below. Other features, objects, and advantages of these systems and methods will be apparent from the description and drawings, and from the claims.

DETAILED DESCRIPTION

This specification describes functionally graded composite structures, such as rings or bearings, and methods that can be used to make functionally graded composite structures. The functionally graded composite structures described here can be used as part of a mechanical system, such as a reciprocating gas compressor. The functionally graded composite structures include two or more polymeric regions of differing compositions, properties, or both, with an interfacial region defining a compositional gradient between the regions. Properties such as strength, stiffness, wear resistance, creep resistance, or thermal conductivity can be controlled for each region, e.g., by incorporating fillers, such as additives, lubricants such as solid lubricants, or reinforcements, into each polymeric region that impart the desired properties to the region. For instance, in a composite ring, the region of the ring that is exposed to wear during operation of the mechanical system can be formed of a composition having high wear resistance, while other regions of the ring can provide higher thermal conductivity, mechanical stiffness or strength, or other properties to the ring.

The presence of two or more regions of differing compositions and properties in the composite structures can have economic advantages. For example, expensive wear resistant fillers can be incorporated only in the region or regions having surfaces exposed to wear, while less expensive fillers, such as fillers to impart thermal conductivity, mechanical strength, stiffness, or other properties, can be incorporated into the other region or regions of the composite structure.

Figure 1:
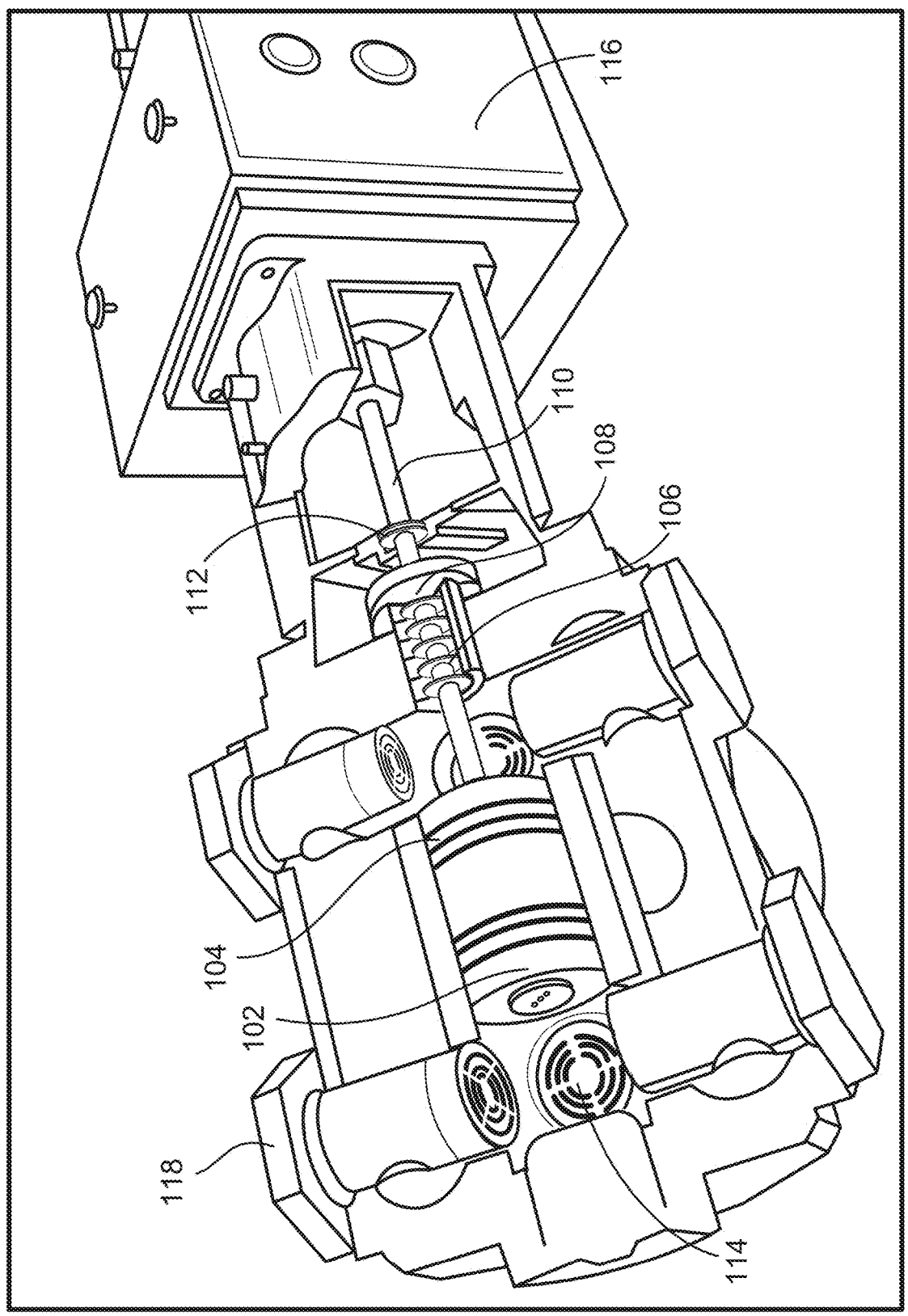
FIG. 1 is a schematic of a reciprocating gas compressor system.

FIG. 1 is a schematic of a reciprocating gas compressor system 100 including functionally graded composite rings 104, 106. The gas compressor system 100 uses pistons 102 that are aided by a crankshaft to increase the level of pressure in gases. The gas compressor system 100 includes a frame 116, cylinders 118, a connecting rod 110, valves 114, oil wipers 112, a packing case 108, a cross head, crankshaft, and bearings. The piston 102 compresses air, moving energy from the crankcase to the gas contained in the cylinder 118. Piston rings 104 and riders are positioned between the piston 102 and the walls of the cylinder 118. Rod rings 106 are positioned around the circumference of the rod 110. Due to continuous movement of the piston 102 and the rod 110 during machine operation, the piston rings 104 and riders and the rod rings 106 are exposed to friction and are prone to wear and tear. The durability of the piston rings and riders, and rod rings determines the life-cycle of the part.

In some examples, the functionally graded composite rings described here can have a wear resistant material on the wear surface (e.g., the surface that is exposed to friction, such as the surface that contacts the piston or rod). The presence of a wear resistant material on the wear surface improves durability of the rings, thereby prolonging the life-cycle of the rings such that replacement is needed less frequently. Another region of the functionally graded composite rings can include a material exhibiting another property, such as thermal conductivity or high mechanical strength or stiffness. A thermally conductive material can help dissipate heat generated at the wear surface. A mechanically strong or stiff material can provide a robust structure to the ring. The ability to combine multiple materials each having distinct properties into a single, composite ring allows a variety of properties to be imparted to the composite ring in an economically efficient manner.

Figure 2:
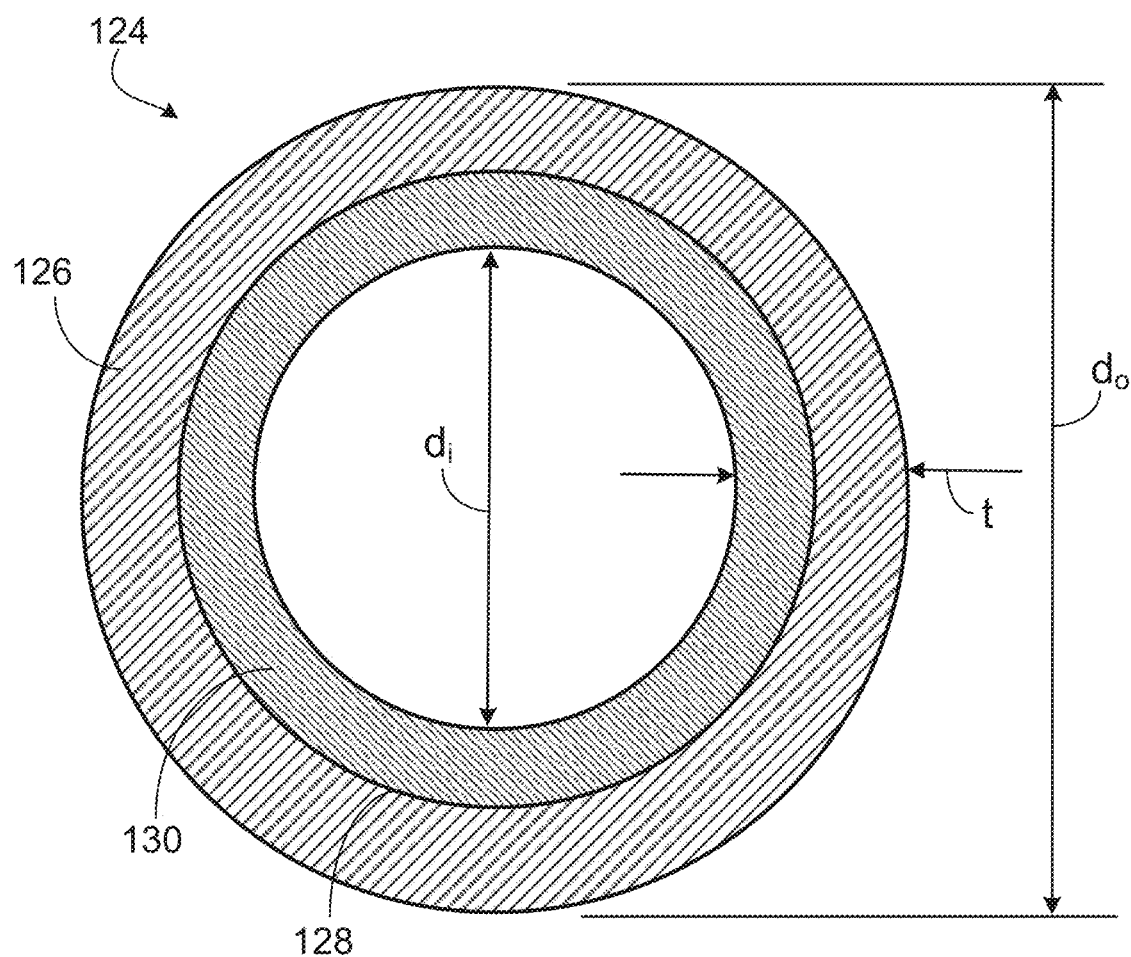
FIG. 2 is a schematic view of a functionally graded composite ring.

FIG. 2 is a schematic view of a functionally graded composite ring 124 that can be used with a mechanical system, such as the reciprocating gas compressor system 100 shown in FIG. 1. In the example of FIG. 2, the ring 124 has a circular cross-section. In some examples, functionally graded composite rings can have other cross-sectional shapes, such as rectangles, hexagons, octagons, or other shapes.

The functionally graded composite ring 124 can be, e.g., a wear ring, a rod ring, a piston band, a wear band, or a dynamic seal ring. The composite ring 124 includes a first polymeric region 126 including a first polymeric material and a second polymeric region 130 including a second polymeric material. The first polymeric region 126 and the polymeric second region 130 are concentric; the first polymeric region 126 defines an outer circumference of the ring 124 and the second polymeric region 130 defines an inner circumference of the ring. An interfacial region 128 defines a compositional gradient between the first polymeric region 126 and the second polymeric region 130 such that the compositional gradient lies along a radius of the ring 124. A compositional gradient is a variation of material composition from one region to another region within the same component. In the interfacial region 128, the ratio of the second polymeric material to the first polymeric material increases in the radial direction toward the inner circumference of the ring 124.

The material properties are different between the first and the second polymeric regions 126, 130 of the ring 124. For example, properties that can differ between regions include wear resistance, thermal conductivity, strength, stiffness, or creep resistance. The properties of each polymeric region depend on the material composition of the region, fillers incorporated into the polymeric material; on the processing conditions during fabrication of the polymeric regions; or a combination thereof. By forming the composite ring 124 to include multiple polymeric regions each with different properties, the composite ring as a whole exhibits properties of both polymeric regions.

In an example, the first polymeric material and the second polymeric material each independently includes one or more of polyether ether ketone, polyether ketone, polyether ketone ketone, polyphenylene sulfide, polyimide (PI), perfluoroalkoxy alkane, ultra-high-molecular-weight polyethylene (UHMWPE), polybenzimidazole, polyamide-imide, polyphenylsulfone, polyester (aliphatic, aromatic, aliphatic-aromatic), or a fluoropolymer such as polytetrafluoroethylene. In some cases, the first polymeric material, the second polymeric material, or both also include one or more of polyether ketone, polyether ketone ether ketone ketone, or polyether ketone ketone.

The material of each of the first polymeric region 126 and the second polymeric region 130 can be chosen to impart desired properties to the respective polymeric regions, e.g., to impart wear resistance, thermal conductivity, stiffness, mechanical strength, creep resistance, performance at high temperature or low temperature, resistance to certain chemistries (e.g., to certain gas chemistries), or another property, or a combination thereof. The first and the second polymeric region 126, 130 can have different compositions such that each region has different properties. In some examples, the polymeric material itself is chosen to impart the desired property. In some examples, one or more fillers can be added to the polymeric material of the first polymeric region 126, the second polymeric region 130, or both to impart the desired property. The filler can be, e.g., a solid lubricant or an additive to enhance the wear resistance of the polymeric region; a filler to modify (e.g., increase) a thermal conductivity of the region; a filler to modify (e.g., increase) the stiffness of the region; a filler to modify (e.g., increase) the mechanical strength of the region, or any combination thereof. In some cases, the filler includes one or more of molybdenum disulfide, tungsten disulfide, bronze, boron nitride, titanium dioxide, aluminum oxide, or silicate minerals (in particular aluminosilicates, aluminium phyllosilicates, aluminum magnesium silicates and magnesium silicates) and their surface functionalized, fluorinated or silane treated derivatives and other clay minerals, sulfides and sulfates with beneficial tribological and antiwear properties. In some cases, the filler includes carbon, e.g., one or more of carbon powder, carbon particles, carbon fibers, graphene, graphite, or carbon nanotubes. In some examples, the filler includes a polymer, e.g., one or more of polytetrafluoroethylene, polyether ether ketone, polyphenylene sulfide, polyphenylene sulfide, polyimide, or polybenzimidazole. In some cases, the filler includes a glass, e.g., one or more of glass beads or glass fibers.

A wear resistance of the first and the second polymeric regions 126, 130 can be different, e.g., such that the region with the greater wear resistance is formed on a wear surface of the composite ring 124. The wear surface of a component (e.g., the composite ring) is a surface that is exposed to wear, e.g., caused by friction resulting from motion of elements such as rods or pistons. Wear resistance is the ability of a material to withstand exposure to wear without becoming damaged. For example, the wear resistance of the second polymeric region 130 can be greater than the wear resistance of the first polymeric region 126. This configuration, in which the second, inner polymeric region 130 has greater wear resistance, is useful when the composite ring 124 is a rod ring. A rod ring is disposed around a rod and a seal is formed between the rod and the inner surface of the ring; making the inner surface of the rod ring the wear surface. In some cases, the wear resistance of the first polymeric region 126 can be greater than the wear resistance of the second polymeric region 130. This configuration, in which the first, outer polymeric region 126 has greater wear resistance, is useful when the composite ring is a piston ring. A piston ring is disposed around a piston and a contact is formed between the piston ring and the cylinder walls of the system. As the piston moves up and down, friction develops between the walls of the cylinder and the outer surface of the piston ring, making the outer surface of a piston ring the wear surface.

When one polymeric region of the composite ring 124 is a wear resistant region, the other polymeric region can be designed to impart other properties to the composite ring 124, e.g., stiffness, thermal conductivity, mechanical strength, or creep resistance, or a combination thereof. The resulting composite ring 124 has a wear resistant surface and also one or more other properties. For instance, for a rod ring, the second, inner polymeric region is a wear resistant material to provide a wear resistant inner surface, and the first, outer polymeric region can be a thermally conductive material to dissipate heat generated by friction on the wear surface. The wear resistance of the second region is greater than that of the first region, and the thermal conductivity of the first region is greater than that of the second region. Alternatively or additionally, the first region can be a stiff or mechanically strong region to provide a robust physical structure to the ring, such that the stiffness or mechanical strength of the first region is greater than that of the second region. Wear resistant fillers, such as solid lubricants or additives, can be expensive. By including a wear resistant material as only a portion of the entire composite ring 124, the materials cost can be reduced.

Fillers that enhance the wear resistance of a region can include solid lubricants or wear resistant additives. A solid lubricant is an additive that helps with wear performance of the composite by reducing the friction between the composite and the contact surface. Solid lubricants are not necessarily wear resistant themselves but by reducing friction, they help improve the wear resistance of the overall system. Some common examples are polytetrafluoroethylene (PTFE), graphite, boron nitride, molybdenum disulphide. Wear resistant additives such as carbon and carbon fibers, glass fiber, alumina, several minerals and ceramics are harder and naturally wear resistant materials and they directly help with wear resistance of the composite. The region of the composite ring 124 including lubricants or wear resistant additives has a wear resistance that is greater than the wear resistance of the other region of the composite ring 124. Lubricants can include PTFE, graphite, graphene, molybdenum disulfide ($MoS_2$), boron nitride, or tungsten disulfide, or a combination thereof. Fillers can include wear resistant additives such as alumina, glass, bronze, short carbon fibers, carbon particles or powder, titanium dioxide (TiO2), other ceramics, or a combination thereof. Fillers that enhance the thermal conductivity of a region help dissipate the heat from one region to another region of the ring. The region of the composite ring 124 that includes thermally conductive fillers has a thermal conductivity that is greater than the thermal conductivity of the other region of the composite ring 124. Fillers for enhanced thermal conductivity can include, e.g., molybdenum disulfide, tungsten disulfide, bronze, boron nitride, titanium dioxide, or aluminum oxide, carbon, carbon powder, carbon particles, carbon fibers, graphene, graphite, or carbon nanotubes, or a combination thereof. Fillers that enhance the stiffness or mechanical strength of a region can include, e.g., glass or carbon such as carbon powder, carbon particles, carbon fibers, graphene, graphite, or carbon nanotubes, glass beads or glass fibers, or a combination thereof. Each polymeric region 126, 130 can include any of the above materials independently or in a combination thereof. The region of the composite ring 124 that includes fillers for stiffness or mechanical strength has a stiffness or mechanical strength that is greater than the stiffness or mechanical strength of the other region of the composite ring 124.

In an example, a wear resistant, low friction region includes 40-70% by mass PTFE, 20-30% by mass carbon, and 5-20% by mass graphite. In an example, a wear resistant, low friction region includes 40-70% by mass PTFE, 10-30% by mass glass, and 5-15% by mass $MoS_2$. In an example, a wear resistant, low friction region includes 50-70% by mass PEEK, 10-30% by mass PTFE, and 5-20% by mass graphite. In an example, the wear resistant, low friction region includes 40-70% by mass PEEK, 5-20% by mass carbon fiber, 10-20% by mass PTFE, and 5-15% by mass graphite. In an example, a wear resistant, low friction region includes 40-60% by mass PTFE, 40-60% by mass bronze, and 0-15% by mass glass. In an example in which a composite ring includes a wear resistant region with a self-lubricated wear surface and a stiff and mechanically strong region, the wear resistant region includes 50-70% by mass PEEK, 10-30% by mass PTFE, and 5-20% by mass graphite, and the mechanically strong region includes 70% by mass PEEK and 30% by mass carbon fiber or glass fiber.

In some example, fillers such as graphene, alumina, or $TiO_2$ also can be added in low amounts, e.g., between 0.5-5% by mass, to further enhance the wear resistance of the region. Boron nitride can be used as an alternative to graphite or $MoS_2$. Bronze can be used, e.g., with PTFE and glass to increase thermal conductivity.

In some examples, the functionally graded composite ring 124 includes one or more additional polymeric regions, e.g., three polymeric regions, four polymeric regions, or more than four polymeric regions. Each additional polymeric region is concentric with the first and second polymeric regions 126, 130 and is disposed between polymeric regions 126, 130 such that the first polymeric region 126 still defines an outer circumference of the ring 124 and the second polymeric region 130 still defines an inner circumference of the ring 124. Each additional polymeric region includes a polymeric material, which can be the same as or different from the polymeric materials of the regions 126, 130, respectively. The polymeric material of each additional polymeric region can include one or more of polyether ether ketone, polyether ketone, polyether ketone ketone, polyphenylene sulfide, polyimide, perfluoroalkoxy alkane, and ultra-high-molecular-weight polyethylene, polyamide-imide, polyphenylsulfone, fluoropolymer such as PTFE, or combination thereof. Each additional polymeric region can include one or more fillers.

In some examples, the functionally graded composite ring 124 has an inner diameter $d_i$, which can range between 1 to 5.5 inches, and a radial thickness t which can range between 0.3 to 0.7 inches. In some examples, the functionally graded composite ring 124 has an outer diameter $d_o$ which can range between 1 to 36 inches, and the radial thickness t can range between 0.15 to 1 inches. In some composite rings, about one third of the radial thickness experiences wear, and the radial thickness of the wear resistant region can be between about one-third and one-half of the entire radial thickness of the ring.

Figure 3A:
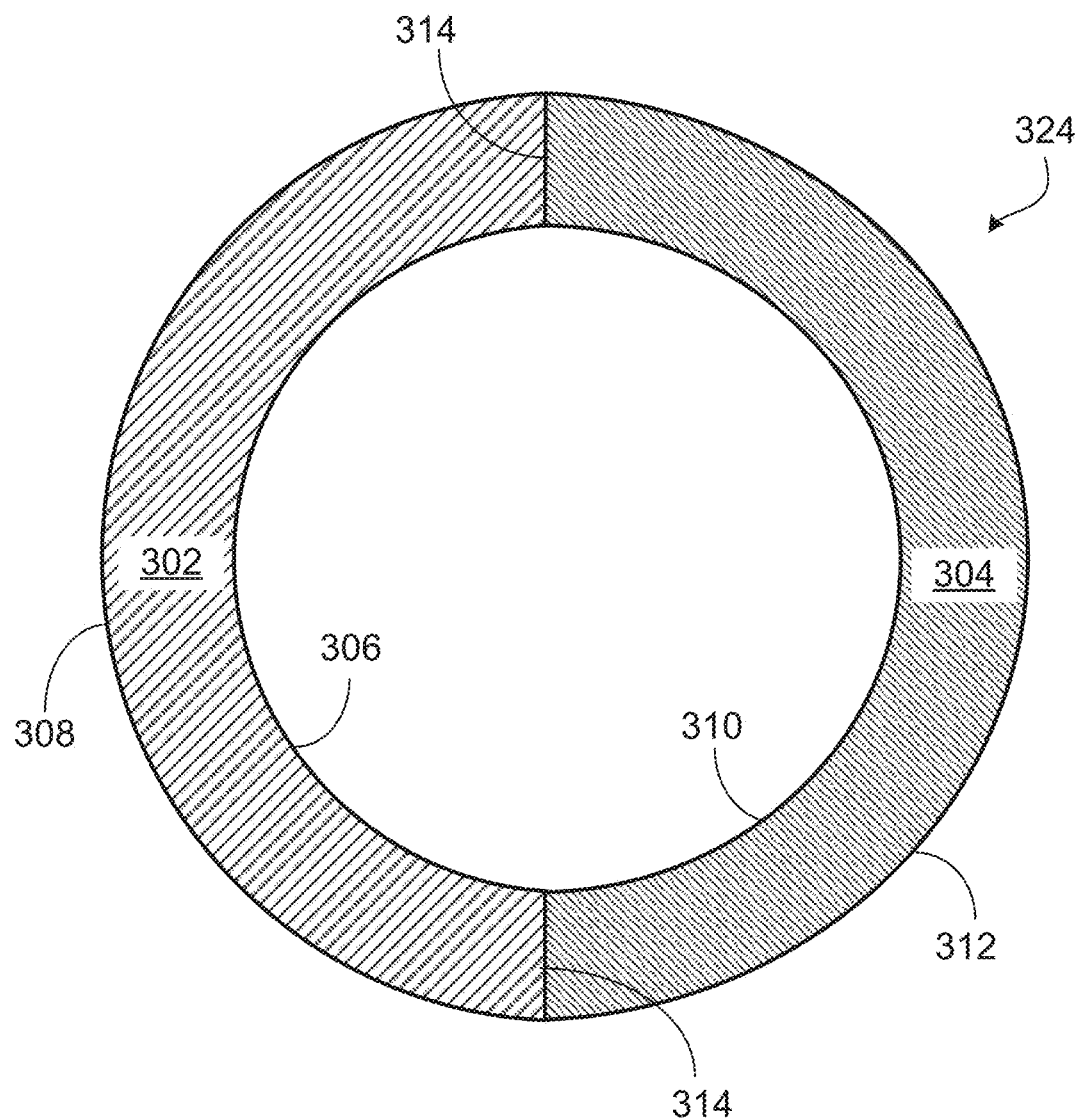
FIGS. 3A-3B are schematic views of functionally graded composite rings.

FIG. 3A is a schematic view of a functionally graded composite ring 324 that can be used with a mechanical system, such as the reciprocating gas compressor system 100 shown in FIG. 1. The functionally graded composite ring 324 can be, e.g., a wear ring, a rod ring, a piston band, a wear band, or a dynamic seal ring. The composite ring 324 includes a first polymeric region 302 formed from a first polymeric material and a second polymeric region 304 formed from a second polymeric material. Each of the first polymeric region and the second polymeric region can independently include one or more fillers to impart a desired property to the region, such as wear resistance, thermal conductivity, mechanical strength, stiffness, creep resistance, or another property. The first and second polymeric regions are radially arranged around the composite ring 324 such that each polymeric region occupies a portion of the radial extent of the ring. An inner surface 306 and an outer surface 308 of the first polymeric region 302 define a first portion of an inner circumference and an outer circumference, respectively, of the ring 324. An inner surface 310 and an outer surface 312 of the second polymeric region 304 define a second portion of the inner circumference and the outer circumference, respectively, of the ring 324. Interfacial regions 314 each defines a compositional gradient between the first polymeric region 302 and the second polymeric region 304 such that the compositional gradient lies along a portion of the inner circumference and the outer circumference of the ring.

Figure 3B:
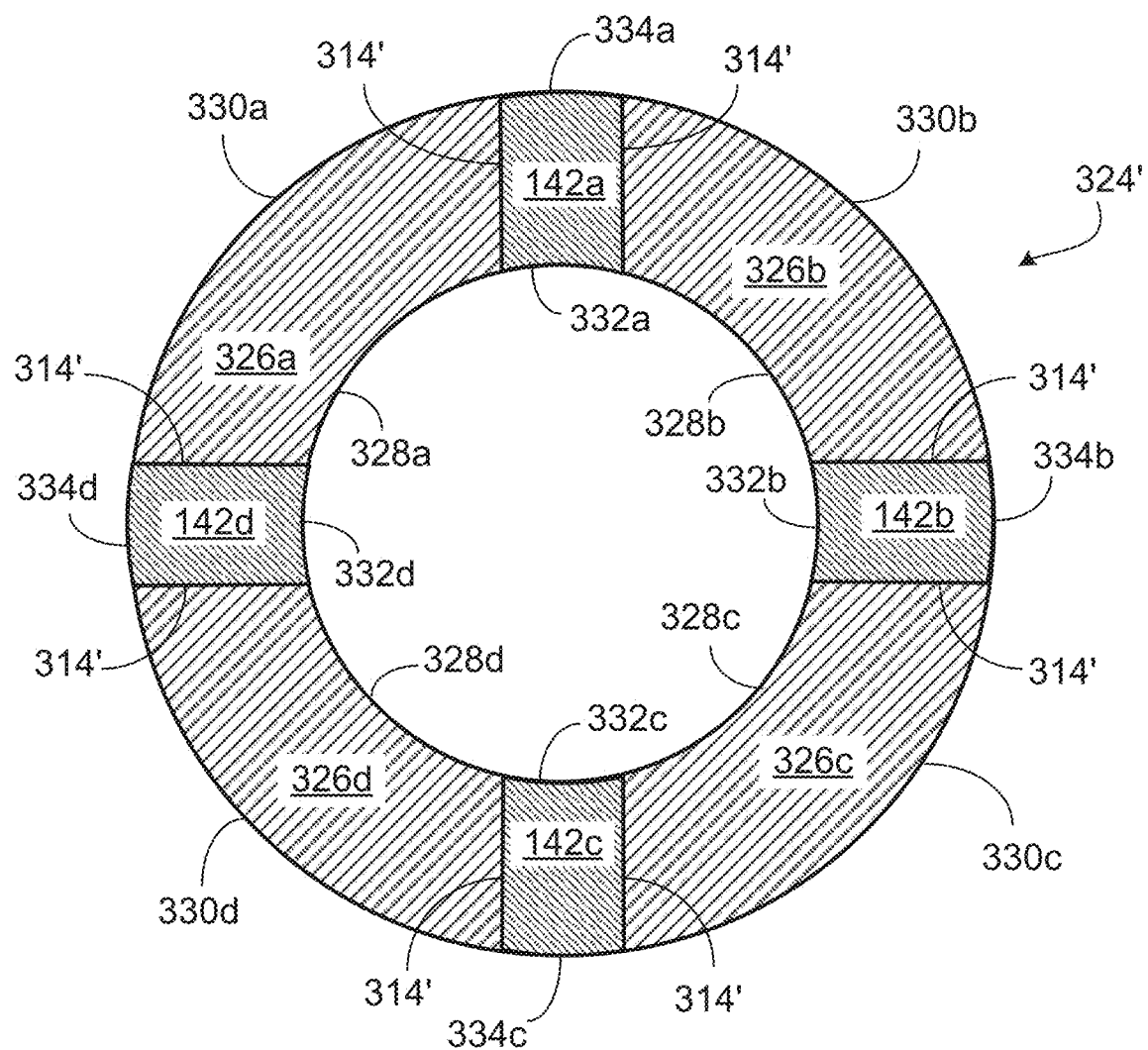

In some examples, each of the radially arranged polymeric regions of a composite ring includes multiple, radially arranged sections. Referring to FIG. 3B, a composite ring 324' includes a first polymeric region including a first polymeric material, where the first polymeric region includes four sections 326a-326d. Each of the sections 326a-326b has the same composition, including the same first polymeric material and the same filler or fillers. The composite ring 324' includes a second polymeric region including a second polymeric material, where the second region includes four sections 142a-142d. Each of the sections 142a-142d has the same composition, including the same second polymeric material and the same filler or fillers. The four sections 142a-142d of the second polymeric region are radially arranged, alternating with the four sections 326a-326d of the first polymeric region. Each section 326a-326d of the first polymeric region includes an inner surface 328a-328d and an outer surface 330a-330d that together define the first portion of the inner circumference and outer circumference, respectively, of the ring 324'. Each section 142a-142d of the second polymeric region includes an inner surface 332a-332d and an outer surface 334a-334d that together define the second portion of the inner circumference and outer circumference, respectively, of the ring 324'. Interfacial regions 314' between each pair of adjacent sections each defines a compositional gradient between the first polymeric region and the polymeric second region (e.g., between respective sections of the first and second polymeric regions).

The first and second polymeric materials of the first and second polymeric regions of the composite rings 324, 324' can be the polymeric materials listed above for the first and second polymeric regions of the composite ring 124 of FIG. 2. The first polymeric region, the polymeric second region, or both can each independently include one or more fillers to impart properties such as wear resistance, thermal conductivity, mechanical strength, stiffness, or creep resistance to the respective regions. The fillers can be those described above in reference to FIG. 2. In an example, one of the regions of the composite rings 324, 324' is a wear resistant, low friction region including 60% by mass PEEK, 30% by mass PTFE, and 10% by mass graphite. In an example, one of the regions of the composite rings 324, 324' is a region with increased thermal conductivity including 60% by mass PEEK, 15% by mass carbon fiber, 20% by mass graphite, and 5% by mass graphene. In some examples, the wear resistant region occupies at least 70% of the total radial extent of the ring 324, 324'.

In some examples, each polymeric region of the ring 324, 324' includes more than four sections, or fewer than four sections. In some examples, the ring 324, 324' includes three, or more than three, radially arranged polymeric regions, with each region including one or more sections.

In some examples, the functionally graded composite ring 324, 324' of FIG. 3 has dimensions similar to those described in reference to FIG. 2.

Figure 4:
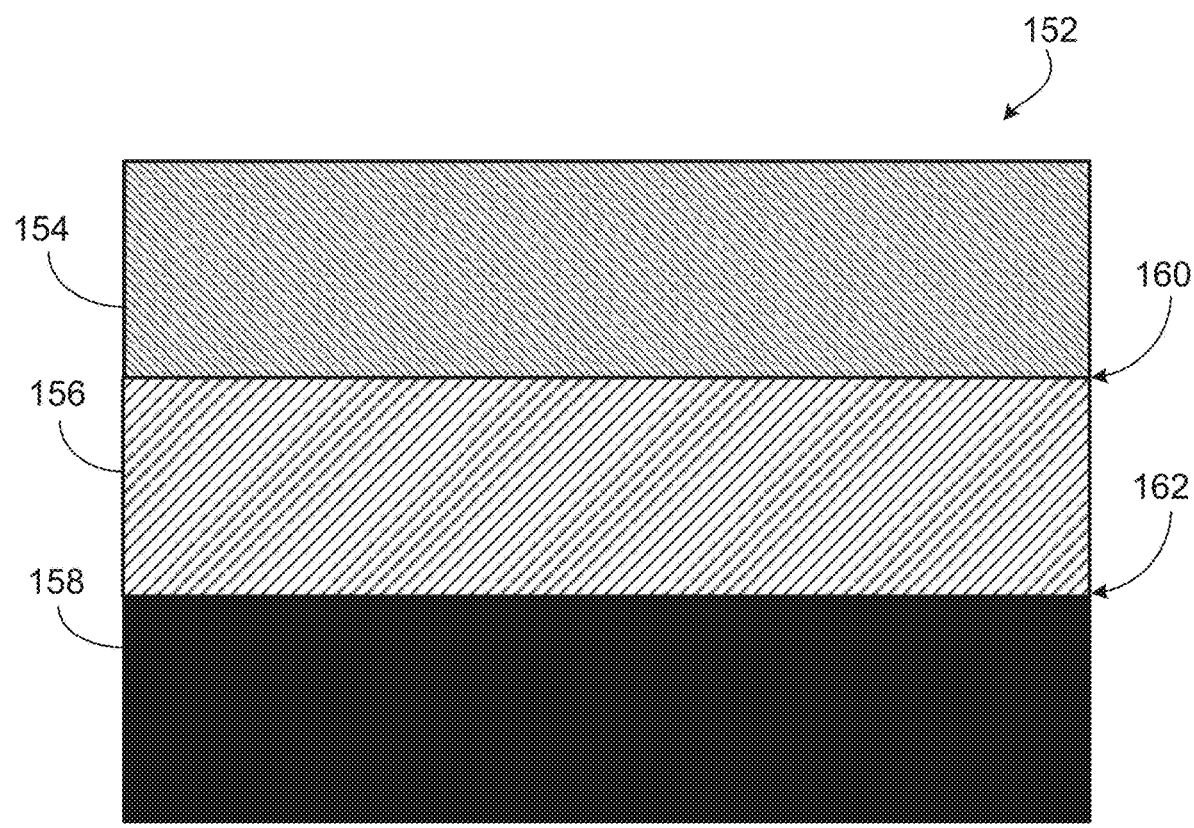
FIG. 4 is a schematic view of a functionally graded composite bearing with multiple layers.

FIG. 4 is a schematic view of a functionally graded composite bearing 152 that can be used with a mechanical system, such as rotating machinery. The functionally graded composite bearing 152 is a multilayer structure that includes a first layer 154 formed from a first polymeric material, a second layer 156 formed from a second polymeric material, and a third layer 158 formed from a third polymeric material. The polymeric materials can be those described above with reference to FIG. 2. Each layer can include a filler, such as those described above with reference to FIG. 2, to impart certain properties to the layer, such as wear resistance, thermal conductivity, stiffness, mechanical strength, or creep resistance. The first layer 154 is disposed on the second layer 156, and the second layer 156 is disposed on the third layer 158. Interfacial regions 160 and 162 define a compositional gradient between the first layer 154 and the second layer 156, and between the second layer 156 and the third layer 158, respectively. In an example, the first layer 154 is a wear resistant layer that includes PEEK with 0-15% by mass PTFE, 0-15% by mass graphite, and 0-10% by mass carbon fiber; and the second and third layers 156, 158 provide mechanical strength and stiffness to the bearing and include PEEK with 30% by mass carbon fiber, and the first layer 154 includes PEEK with 10% by mass PTFE, 10% by mass graphite, and 10% by mass carbon fiber. The functionally graded composite bearing 152 can be a full plastic bearing including a bearing grade polymer as one or more of the layers and a strong backing polymer as another one or more of the layers.

Figure 5:
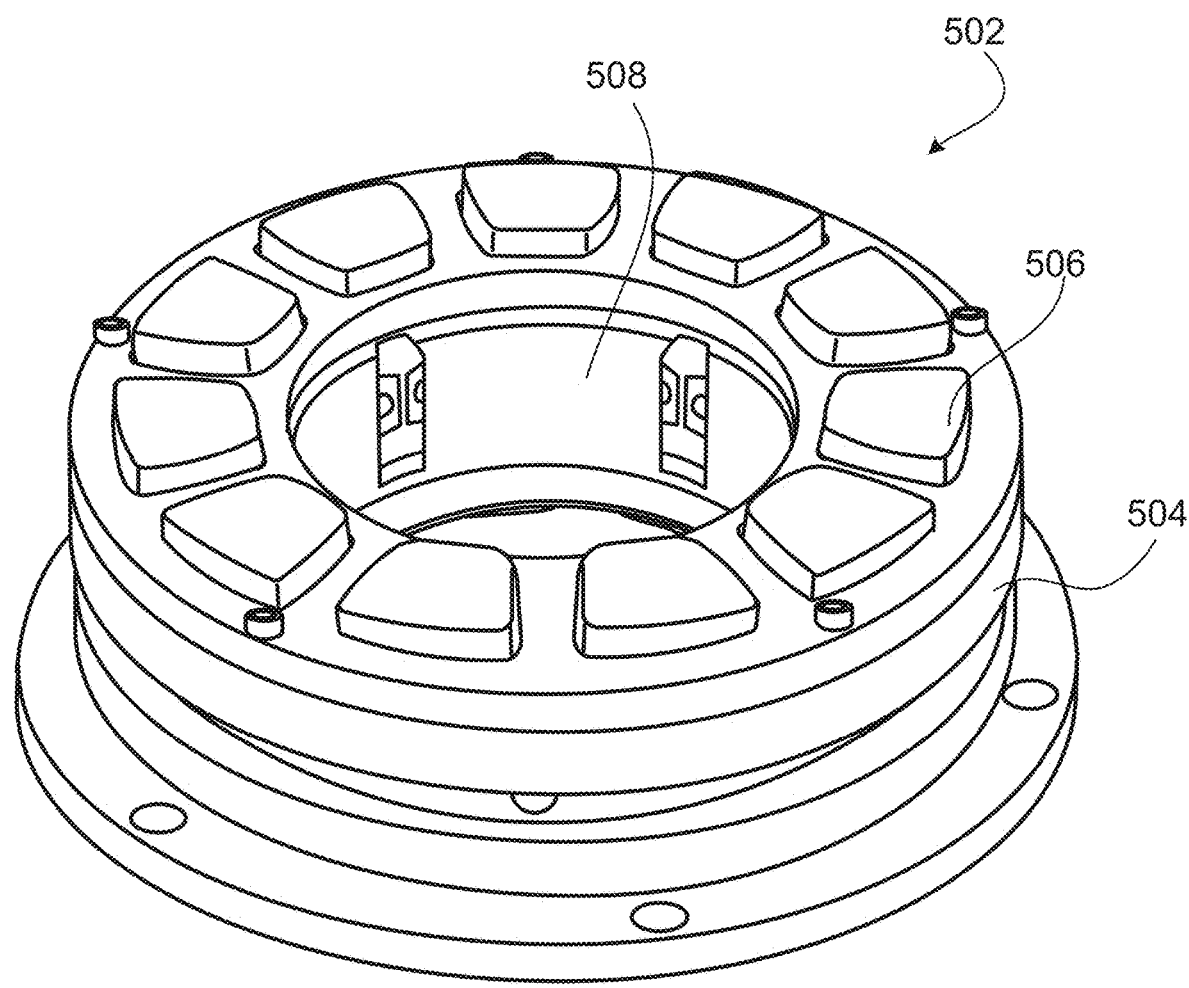
FIG. 5 is a schematic of a bearing assembly.

FIG. 5 is a schematic of a bearing assembly 502 including a bearing 504 with bearing pads 506 such as those shown in FIG. 4, e.g., for use with a mechanical system, such as rotating machinery. The bearing 502 also includes interior pads 508 disposed around an interior surface of the bearing.

In some examples, the bearing pads 152 of the bearing assembly 502 are a polymer-lined pads that each includes a polymer sheet, such as the multilayer polymeric bearing 152 of FIG. 4, bonded on a metallic backing. This configuration can help reduce the incidence of interfacial de-bonding between polymer and metal materials, thus helping to prevent failure. In some examples, the interior pads 508 are also polymeric pads.

Figure 6A:
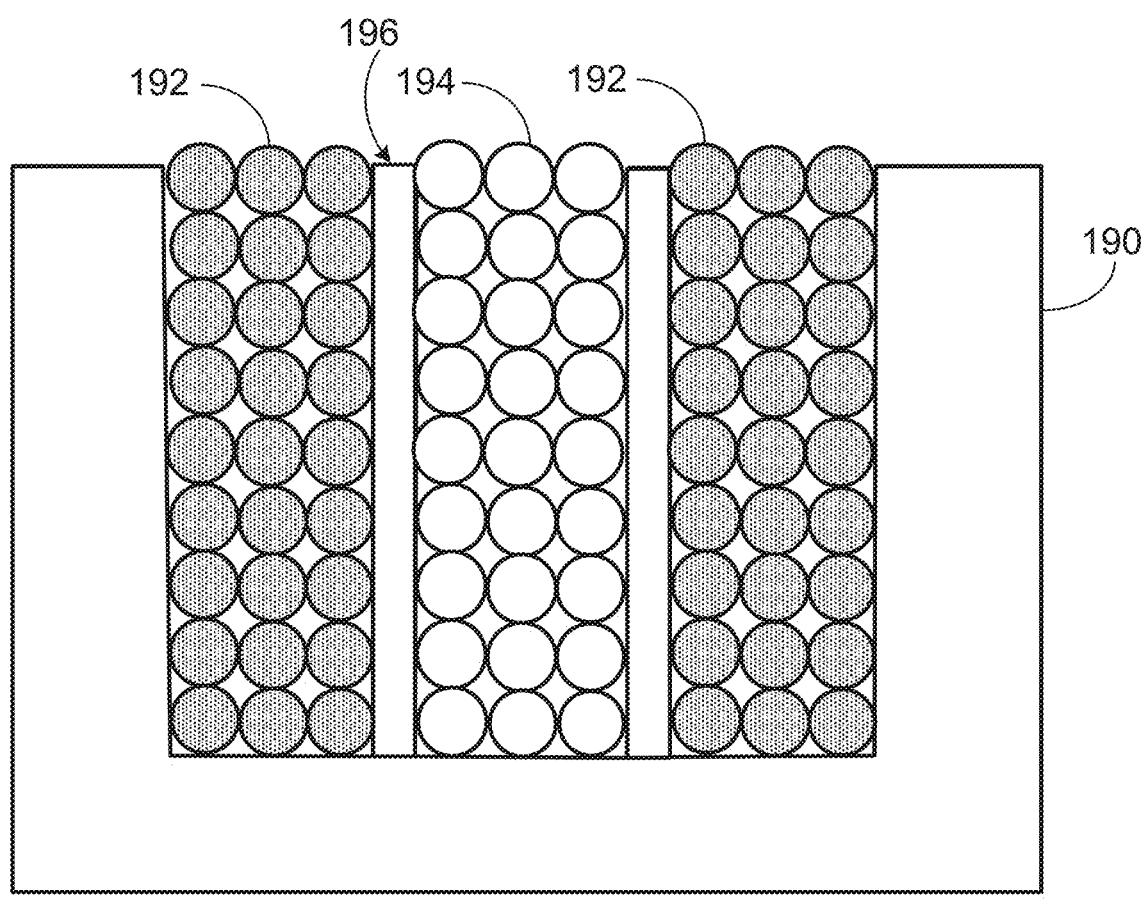
FIGS. 6A-6E are diagrams of a method of fabricating functionally graded composite structures.

FIG. 6A-6E are a schematic depiction of a method of fabricating functionally graded composite structures. Referring to FIG. 6A, a first polymeric powder 192 is provided to a portion 197 of a cylindrical mold 190 (shown in cross section). A mold is a frame that can be filled with a raw material such as polymer, glass, metal, or ceramic. The shape of the mold resembles the shape of the desired final part. A second polymeric powder 194 is provided to a portion 198 of the mold 190. The two polymeric powders 192, 194 are separated by a temporary divider 196 disposed between each portion 197, 198 of the mold 190. To form a structure including a polymer with fillers or additives, the fillers or additives are blended with the polymeric powders before molding, and the blended powder is placed into the mold 190.

Figure 6B:
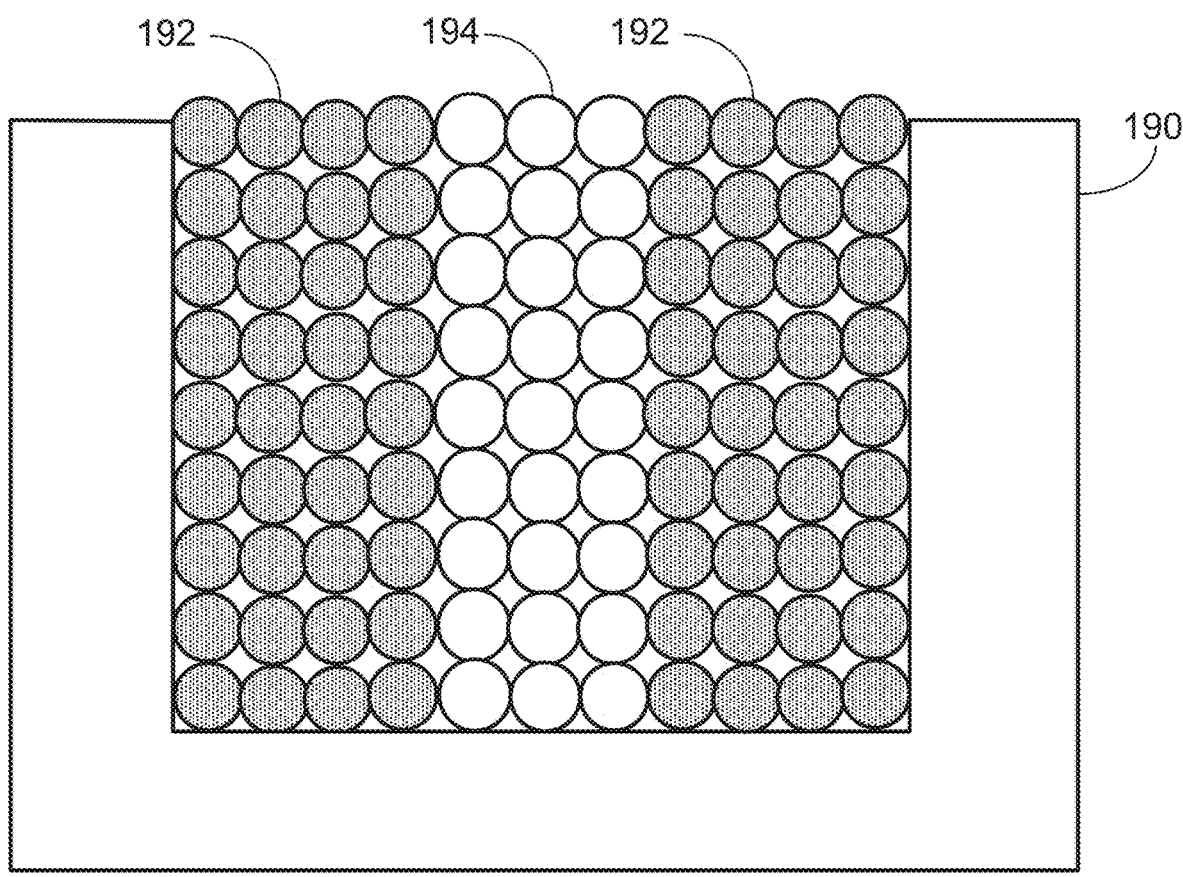

Referring to FIG. 6B, once each portion of the mold 190 is filled with powders 192, 194, the temporary divider 196 is removed. Removal of the temporary divider 196 brings the powders 192, 194 into contact, resulting in limited mixing between the powders that will form the compositional gradient in the interfacial region of the resulting composite structure.

Filling of the mold can be also accomplished by means of simultaneous co-deposition (or coaxial, concentric deposition) of powders through an automated feeder system found in powder bed fusion additive manufacturing systems, thus eliminating the need for the temporary divider.

Figure 6C:
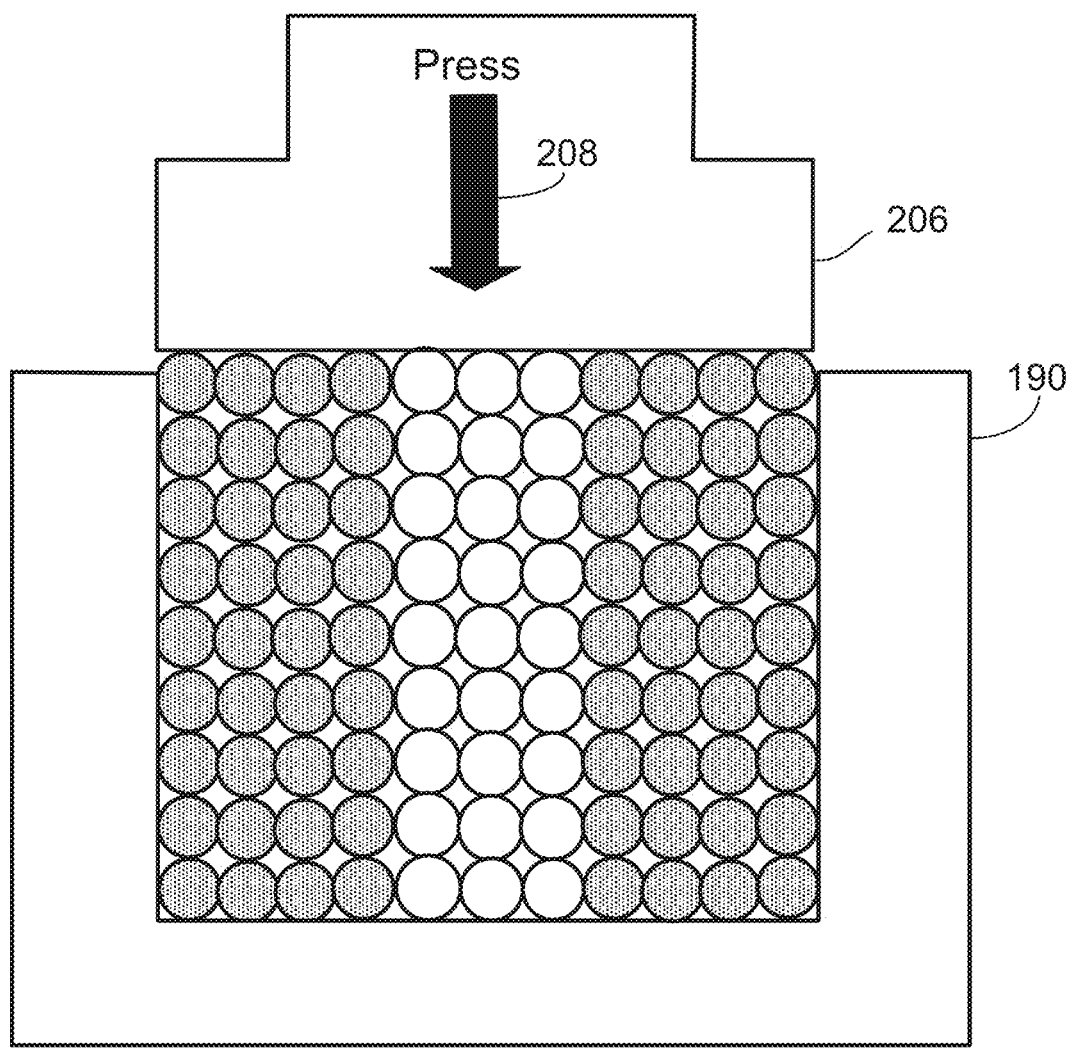
Figure 6D:
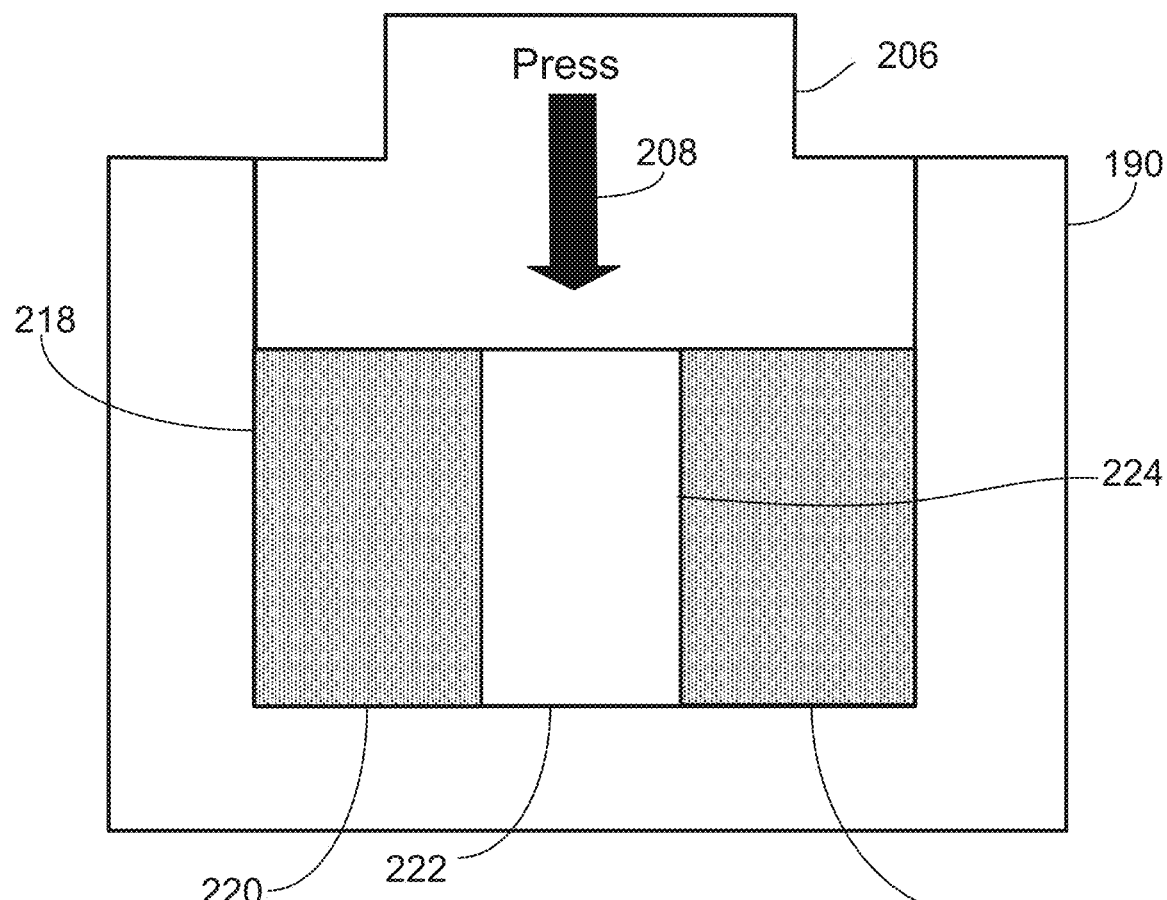

Referring to FIGS. 6C-6D, the first polymeric powder 192 and the second polymeric powder 194 are compressed in the mold 190 by application of a force 208 using a press 206. The compressed powders yield a composite billet 218 (as shown in FIG. 6D). The composite billet 218 includes a first region 220 formed by compressing the first polymeric powder 192, a second region 222 formed by compressing the second polymeric powder 194, and an interfacial region 224 defining a compositional gradient between the first region 220 and the second region 222. In some cases, the mold 190 is heated during the compression process, which facilitates even distribution of the powder in each region.

In an example, to form a billet PTFE powders, a pressure of 4000-8000 psi is applied to a first end of the mold for 4-10 minutes at ambient temperature. In an example, to form a billet from PEEK powders, a pressure of 8000-10000 psi it is applied for 4-10 minutes at ambient temperature. In some examples, to fabricate stock shape geometries (e.g., 6-8 inches long billets) the mold is reversed relative to the press and pressure is applied from the other end of the mold, e.g., to homogenize the effect of the applied pressure through the length of the billet.

Figure 6E:
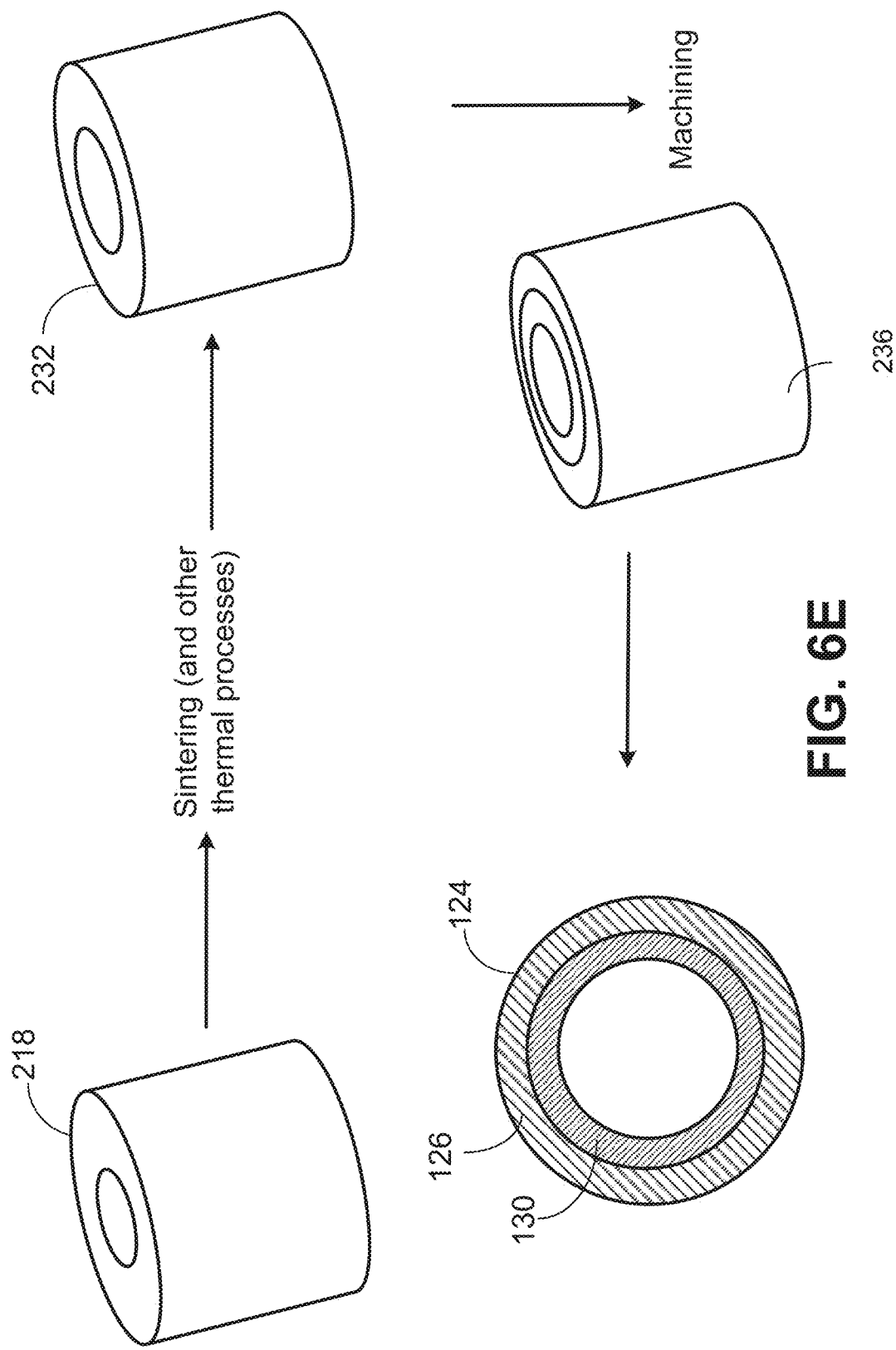

Referring to FIG. 6E, in the example shown, the composite billet 218 is separated from the mold 190. The billet 218 is heat treated, e.g., sintered, to form a solid, compacted stock shape 232. For instance, a billet formed from compressed PTFE powders is removed from the mold and sintered at temperature of 675° F.-700° F. for 4-10 hours, e.g., depending on the size of the billet. In some examples, heat treatment such as sintering takes place while the billet is still in the mold. For instance, a billet formed from compressed PEEK powders is sintered inside the mold at temperature of 730° F.-770° F. for 8-12 hours. Pressure is applied to the hot mold (e.g., hot molding) while the sintered material therein is hot and molten. This additional application of pressure improves fusion and quality of the material. In one example of a hot molding process, first polymeric powder 192 and the second polymeric powder 194 are molded in the press at room temperature first, and then sent to sintering. At the end of sintering, the mold is moved back to the press to compress the material in the mold when the material is hot and molten.

Referring again to FIG. 6E, the stock shape 232 is machined into a composite ring or bearing having a desired size and shape. A finished component may be, for example, a ring 124 including a first polymeric region 126 and a second polymeric region 130. Similar processes can be used for billets formed of other polymeric materials, such as PPS, UHMWPE, PI, and/or combination thereof, with sintering temperatures above the melting temperature of the material.

The functionally graded composite structures described here also can be fabricated by other techniques, such as injection molding, casting, 3D printing, laser cutting and texturing, extrusion, micro-machining, co-forming, re-flow, electron beam melting and/or other suitable techniques.

Figure 7:
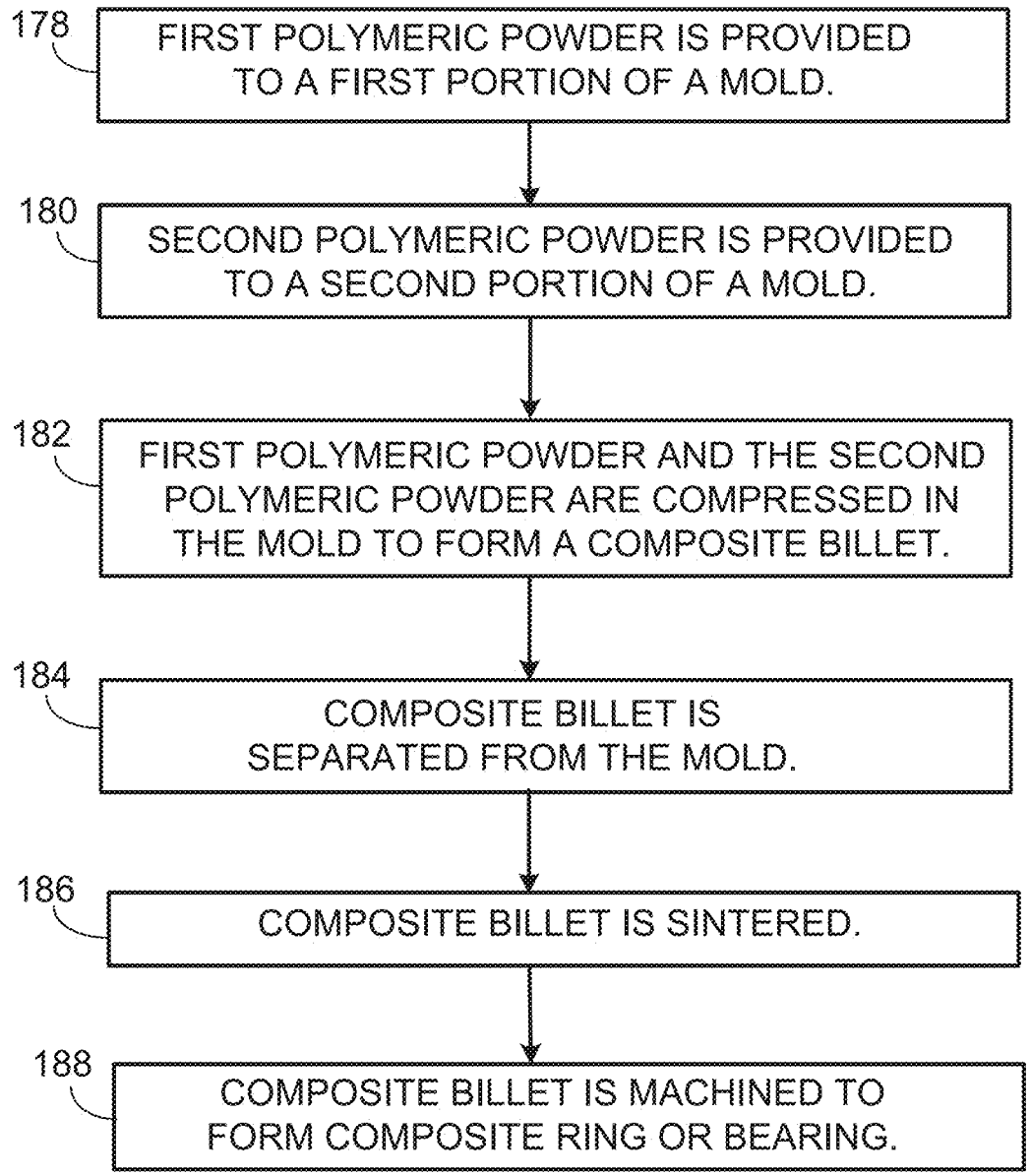
FIG. 7 is a flowchart showing a method of fabricating functionally graded composite structures.

Referring to FIG. 7, a method of fabricating a composite ring or bearing includes providing a first polymeric powder to a first portion of a mold (178) and providing a second polymeric powder to a second portion of the mold (180). The polymeric powders can be, e.g., polyether ether ketone, polyphenylene sulfide, polyimide, perfluoroalkoxy alkane, ultra-high-molecular-weight polyethylene, polybenzimidazole, polyamide-imide, polyphenylsulfone, a fluoropolymer such as PTFE, polyether ketone, polyether ketone ether ketone ketone, or polyether ketone ketone. One or more fillers or additives can be blended with the polymeric powders prior to molding, and the blended polymeric powders are provided to the mold. The fillers can be, e.g., molybdenum disulfide, tungsten disulfide, bronze, boron nitride, titanium dioxide, aluminum oxide, carbon powder, carbon particles, carbon fibers, graphene, graphite, carbon nanotubes, PTFE, polyether ether ketone, polyphenylene sulfide, polyphenylene sulfide, polyimide, polybenzimidazole, glass beads, or glass fibers, or a combination thereof.

The first polymeric powder and the second polymeric powder in the mold are compressed by application of a force to yield a composite billet (182). In some examples, the mold is heated during the compression process.

The composite billet is separated from the mold (184) and sintered (186). In some examples, the composite billet is sintered while in the mold. The sintered composite billet is machined to form functionally graded composite rings or bearings (188).

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results.

Accordingly, the previously described example implementations do not define or constrain the present disclosure. Other changes, substitutions, and alterations are also possible without departing from the spirit and scope of the present disclosure.

A number of embodiments of these systems and methods have been described. Nevertheless, it will be understood that various modifications can be made without departing from the spirit and scope of this disclosure. Accordingly, other embodiments are within the scope of the following claims.

What is claimed is:

1. A machine component, comprising:
a body configured to couple with a moving shaft, the body comprising:
  a first region comprising a first polymeric material;
  a second region comprising a second polymeric material; and
  two or more interfacial regions, wherein at least one of the interfacial regions defines a compositional gradient between the first region and the second region,
  the first region, the second region and the at least one interfacial region extend to an exterior surface of the body, and
  the at least one interfacial region is formed by compression molding the first polymeric material and the second polymeric material in a cylindrical mold to yield the machine component.

2. The machine component of claim 1, wherein one or more physical properties of the first region differ from one or more corresponding physical properties of the second region, and at least one of the physical properties comprises a wear resistance.

3. The machine component of claim 1, wherein at least one of the two or more interfacial regions defines a compositional gradient in a circumferential direction.

4. The machine component of claim 1, wherein each of at least two of the interfacial regions defines a compositional gradient in a circumferential direction.

5. The machine component of claim 1, wherein at least one of the interfacial regions defines a compositional gradient in a radial direction.

6. The machine component of claim 1, wherein the body comprises a third region comprising a third polymeric material, wherein at least one of the two or more interfacial regions defines a compositional gradient between the second region and the third region.

7. The machine component of claim 1, wherein the body comprises a ring configured to couple with a reciprocating rod.

8. The machine component of claim 1, wherein the component comprises a bearing, wherein the body comprises a bearing pad.

9. The machine component of claim 2, wherein the one or more physical properties comprise a stiffness.

10. The machine component of claim 2, wherein the one or more physical properties comprise a mechanical strength.

11. The machine component of claim 2, wherein the one or more physical properties comprise a thermal conductivity.

12. The machine component of claim 6, wherein the at least one of the interfacial regions that defines the compositional gradient between the second region and the third region is formed by compression molding the second polymeric material and the third polymeric material in the cylindrical mold to yield the machine component.

13. A machine component comprising:
a body configured to couple with a moving shaft, the body comprising:
  a first region comprising a first polymeric material;
  a second region comprising a second polymeric material;
  a third region comprising a third polymeric material; and
  two or more interfacial regions, wherein a first interfacial region defines a compositional gradient between the first region and the second region, and a second interfacial region defines a compositional gradient between the second region and the third region, and
  wherein one or more physical properties of the first region, the second region, and the third region are different from each other, and wherein the two or more interfacial regions are formed by compression molding the first polymeric material, the second polymeric material, and the third polymeric material in a cylindrical mold to yield the machine component.

14. The machine component of claim 13, wherein at least one of the physical properties comprises a wear resistance, a stiffness, a mechanical strength, or a thermal conductivity.

15. The machine component of claim 13, wherein at least one of the two or more interfacial regions defines a compositional gradient in a circumferential direction.

16. The machine component of claim 13, wherein each of at least two of the two or more interfacial regions defines a compositional gradient in a circumferential direction.

17. The machine component of claim 13, wherein at least one of the interfacial regions defines a compositional gradient in a radial direction.

18. The machine component of claim 13, wherein the body comprises a ring configured to couple with a reciprocating rod.

19. The machine component of claim 13, wherein the component comprises a bearing and the body comprises a bearing pad.

\* \* \* \* \*